United States Patent [19]

Morinigo et al.

[11] Patent Number: 5,772,179
[45] Date of Patent: Jun. 30, 1998

[54] HINGED ARMATURE ELECTROMAGNETICALLY ACTUATED VALVE

[75] Inventors: Fernando B. Morinigo; Carmi Goldstein, both of Los Angeles; Dennis Bulgatz, Reseda, all of Calif.

[73] Assignee: Aura Systems, Inc., El Segundo, Calif.

[21] Appl. No.: 556,418

[22] Filed: Nov. 9, 1995

Related U.S. Application Data

[63] Continuation-in-part of Ser. No. 358,331, Nov. 9, 1994, abandoned.

[51] Int. Cl.⁶ .............................. F16K 31/06; H01F 7/14
[52] U.S. Cl. ................................ 251/129.1; 251/129.2; 123/90.11; 335/275; 335/276
[58] Field of Search ......................... 251/129.09, 129.1, 251/129.2, 129.15; 335/275, 276; 123/90.11

[56] References Cited

U.S. PATENT DOCUMENTS

| | | | |
|---|---|---|---|
| 1,767,058 | 6/1930 | Eiseman | 251/129.1 X |
| 2,436,354 | 2/1948 | Burke et al. | 335/276 X |
| 3,244,397 | 4/1966 | Fattor | 251/129.1 |
| 3,510,100 | 5/1970 | Makusay et al. | 251/129.2 |
| 3,665,962 | 5/1972 | Dornseiffen | 251/129.15 X |
| 4,269,388 | 5/1981 | Seilly et al. | 123/90.11 X |
| 4,375,793 | 3/1983 | Seilly et al. | 123/90.11 |
| 4,593,658 | 6/1986 | Moloney | 123/90.11 |
| 4,783,047 | 11/1988 | Baltus | 251/129.1 |
| 4,841,923 | 6/1989 | Buchl | 251/129.1 X |
| 5,161,494 | 11/1992 | Brown, Jr. | 123/90.11 |

FOREIGN PATENT DOCUMENTS

| | | | |
|---|---|---|---|
| 673169 | 1/1930 | France | 123/90.11 |
| 1233442 | 10/1960 | France | 251/129.09 |
| 600108 | 11/1959 | Italy | 123/90.11 |
| 2043280 | 3/1980 | Japan | 123/90.11 |
| 1471537 | 4/1977 | United Kingdom | 123/90.11 |

*Primary Examiner*—John Rivell
*Attorney, Agent, or Firm*—Kathy Mojibi Kavcioglu

[57] ABSTRACT

An electromagnetically actuated valve is disclosed. The valve includes an upper electromagnetic element and a lower electromagnetic element in a mirrored and facing relationship to each other. The electromagnetic elements define a central channel that surrounds a vertical axis. The valve further includes an armature element that is disposed intermediate the upper and lower electromagnets. The armature element is pivotally mounted to an armature shaft. The armature shaft is perpendicular to the vertical axis. The valve further includes a coil disposed within the central channel of each of the electromagnetic elements.

5 Claims, 1 Drawing Sheet

HINGED ARMATURE ELECTROMAGNETICALLY ACTUATED VALVE

RELATED APPLICATION DATA

The present application is a continuation-in-part of commonly owned, application U.S. Ser. No. 08/358,331. Now abandoned, filed on Nov. 9, 1994 for Hinged Armature Electromagnetically Actuated Valve, which is incorporated by reference herein.

FIELD OF THE INVENTION

The present invention relates generally to an electromagnetically actuated valve, and more particularly to an electromagnetically actuated valve having a pivoting armature.

BACKGROUND OF THE INVENTION

In the past, electromagnetic actuators and electromagnetically actuated valves included electromagnetic elements in facing relationship with each other having an armature element disposed intermediate the electromagnetic elements The electromagnetic elements and armature were disposed about a central vertical axis. The valve or actuator shaft extended collinear with the central vertical axis. The armature was attracted to either the upper or lower electromagnetic element and guided in its motion by an armature shaft. The armature shaft was also collinear with the central vertical axis. Therefore, the armature displacement motion was parallel to the motion of the valve or actuator.

One problem with the known design arises when the valve is used in connection with an existing engine head. Because of the relatively small space available between the valve stems, it is difficult to use known electromagnetically actuated valves with an existing engine and still obtain the necessary magnetic pole face area. Therefore, it is desirable to have an electromagnetically actuated valve that is geometrically flexible and can be used with an existing engine head.

Another problem with the known electromagnetically actuated valve designs is that minor misalignment of the components created binding of the bearings and increased friction. Therefore, it is desirable to have an electromagnetically actuated valve that is robust and not as susceptible to minor misalignment of components.

Another problem with known electromagnetically actuated valves arises when it is desired to use lamination on the pole faces in order to reduce eddy currents. It is very difficult and expensive to use lamination on the known round or ring-shaped pole faces. Therefore, it is desirable to have an electromagnetically actuated valve having a pole face of a geometrical shape that is easily manufactured from laminations.

The natural frequency of the vibrational motion of unpowered electromagnetically actuated valves depends on the stiffness of springs used in the valve and the inertia of the moving components. A problem with the known electromagnetically actuated valves is that the inertia of the moving components is greater than desired. Therefore it is desirable to have an electromagnetically actuated valve with reduced inertia of the moving parts, which results in smaller electromagnet weight and power.

SUMMARY OF THE INVENTION

Accordingly, it is a primary object of the present invention to overcome one or more disadvantages and limitations of the prior art.

A significant object of the present invention is to provide an electromagnetically actuated valve that is easily retrofit to existing engine heads.

Another object of the present invention is to provide an electromagnetic actuator that requires reduced coil and electromagnet weight.

Another object of the present invention is to provide electromagnetic actuator that can be efficiently manufactured.

According to a broad aspect of the present invention, an electromagnetically actuated valve comprises an upper electromagnetic element and a lower electromagnetic element in a mirrored and facing relationship to each other. The electromagnetic elements define a central channel that surrounds a vertical axis. The valve further includes an armature element that is disposed intermediate the upper and lower electromagnets. The armature element is pivotally mounted to an armature shaft. The armature shaft is perpendicular to the vertical axis. The valve further includes a coil disposed within the central channel of each of the electromagnetic elements.

A feature of the present invention is that geometry of the valve is more flexible than prior known valves.

Another feature of the present invention is that the inertia of the moving components of the valve is decreased.

Another feature of the present invention is that the electromagnets and coils are easily manufactured.

These and other objects, advantages and features of the present invention will become readily apparent to those skilled in the art from a study of the following description of an exemplary preferred embodiment when read in conjunction with the attached drawing and appended claims.

DESCRIPTION OF AN EXEMPLARY PREFERRED EMBODIMENT

Figure 1:
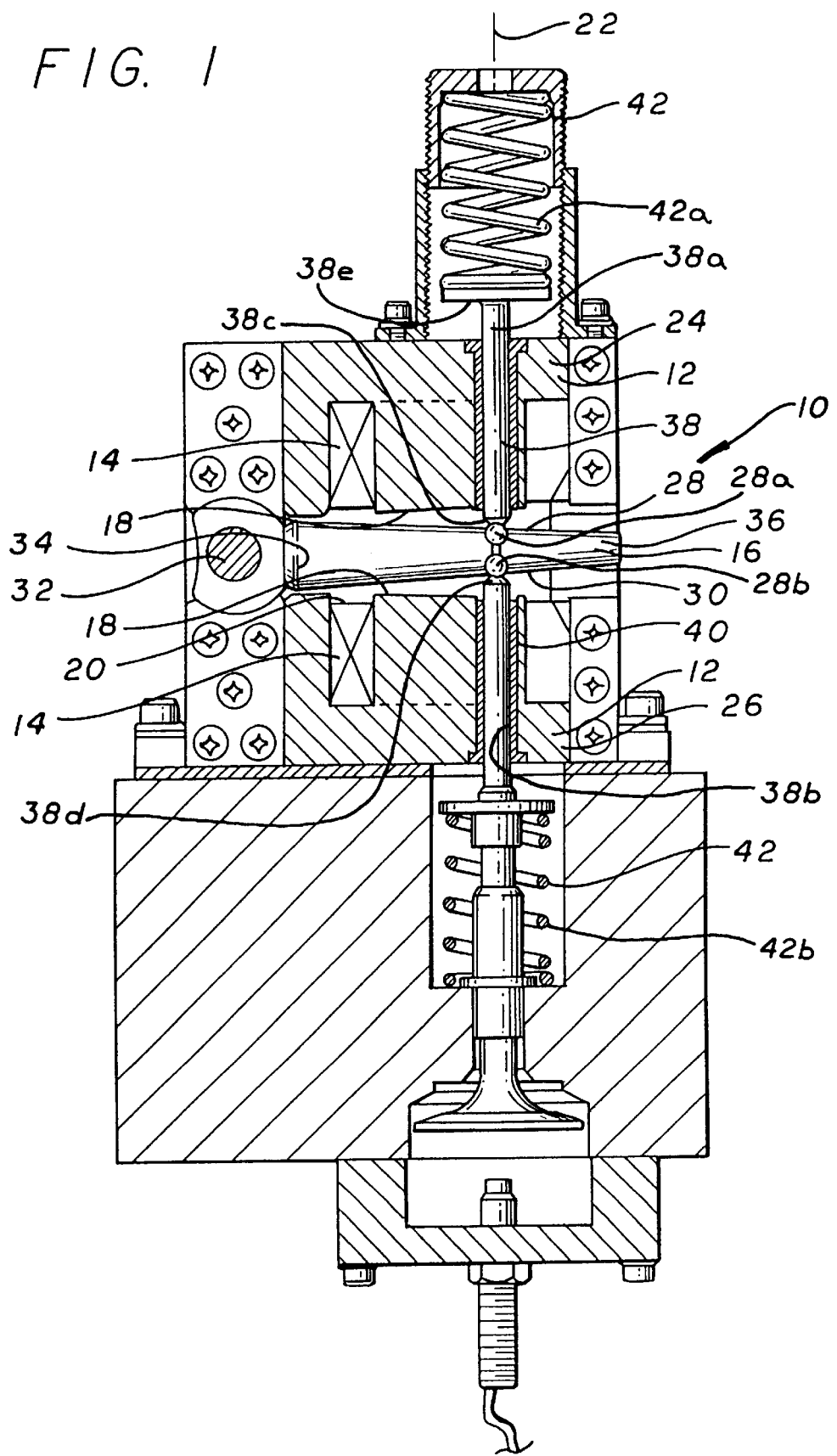
FIG. 1 is a cross-sectional view of an electromagnetically actuated valve of the present invention.

Referring now to FIG. 1, one embodiment of an electromagnetically actuated valve 10 of the present invention is shown in cross-section. In the embodiment shown, the valve 10 includes a pair of electromagnetic elements 12, a plurality of coils 14, and a core or armature element 16. Each of the electromagnetic elements 12 has a pole face 18 with a central channel 20 disposed in the face 18. The central channel 20 surrounds a central vertical axis 22. The coil 14 of each electromagnetic element is disposed within the channel 18.

In the embodiment shown in FIG. 1, the pair of electromagnetic elements 12 further comprises an upper electromagnetic element 24 and a lower electromagnetic element 26. The upper and lower electromagnetic elements are in a mirrored relationship to each other, with the faces 18 and central channels 20 of the upper and lower electromagnetic elements being in a facing relationship to each other.

Disposed intermediate the upper and lower electromagnetic elements 24, 26 is the armature element 16. The armature element 16 provides an upper pole face 28 in a facing relationship to the pole face 18 of the upper electromagnetic element 24 and a lower pole face 30 in a facing relationship to the pole face 18 of the lower electromagnetic element 26. The armature element is rotatingly or pivotally mounted to an armature shaft 32, such that the armature shaft operates similar to a hinge. The armature element 16 defines a proximal end 34 adjacent the armature shaft 32 and a distal end 36 distal from the armature shaft 32. The armature is shaped so as to taper in thickness from the proximal end 34 down to the distal end 36.

The valve 10 further includes a valve shaft 38 having a first valve shaft portion 38a and a second valve shaft portion 38b that extends in axial alignment with the central vertical axis 22 of the valve. The upper and lower electromagnet elements 24, 26 are moveably engaged around the first valve shaft portion 38a and second valve shaft portion 38b respectively, and the armature 16 is interconnected to the valve shaft 38. More specifically, the first valve shaft portion 38a and the second valve shaft portion 38b each have a first end 38c, 38d, in intimate slideable contact with the upper face 28 and lower face 30 of the armature 16. The upper face 28 and the lower face 30 of the armature 16 may be further provided with hemispherical projections 28a, 28a at the point of second valve shaft portion 38b each have a first end 38c, 38d, in intimate slideable contact with upper face 28 and lower face 30 of the armature 16. The upper face 28 and the lower face 30 of the armature 16 may be further provided with hemispheical projection 28a, 28a at the point of contact with the first end 38c, 38d of each of the first valve shaft portion 38a and the second valve shaft portion 28b. In the embodiment shown in FIG. 1, a plurality of bearings 40 are disposed intermediate the valve shaft 38 and the electromagnet elements 24, 26 to allow sliding motion of the valve shaft 38. Therefore, the valve shaft 38 moves in a direction parallel with the vertical axis 22 of the valve.

As previously described, the armature 16 rotates or pivots about the armature shaft 32. The armature shaft 32 extends perpendicular to the valve shaft 38 and the vertical axis 22. Also, the armature shaft 32 is offset from the valve shaft 38. Therefore, the armature 16 pivots in an upward and downward direction, however, the armature's direction of movement is at an angle and is not parallel to the direction of movement of the valve shaft 38. Moreover, the armature's direction of movement is not parallel to the vertical axis 22 of the valve. The taper of the armature 16 allows its upper face 28 to be mateable with the pole face 18 of the upper electromagnetic element 24 when the armature 16 pivots upward and further allows its lower face 30 to be mateable with the pole face 18 of the lower electromagnetic element 26 when the armature 16 pivots downward.

There are several advantages of the pivoting armature design of the present invention. First, the pivoting armature allows for a low profile and flexible geometry. As a result, it is easier to retrofit existing engines and other applications with the valve 10. Another advantage of the pivoting armature is that the armature is less susceptible to minor misalignment of the components. Minor misalignment could cause increased friction and binding of the bearings. A third advantage is that the air gaps traversed by the magnetic flux in the valve are smaller than in a conventional design. Therefore, magnetic flux leakage is minimized and coil weight and coil waste power are reduced. A fourth advantage is that the inertia of the moving components is reduced by the use of the pivoting armature as compared to an axially moving armature. The natural frequency of the vibrational motion of the valve is dependent upon the inertia of the moving components. The reduced inertia therefore results in smaller electromagnet weight.

The electromagnet elements 24, 26 and the coils 14 are preferably rectangular in cross-section. As a result, the pole faces 18 of the electromagnets are also rectangular shaped in cross-section. The pole faces 18 of the electromagnet elements may be easily modified to accommodate the shape of the armature 16, as desired for each application.

An advantage of the rectangular-shaped electromagnet elements 24, 26 and coils 14 is evident when attempting to retrofit an existing engine with an electromagnetically actuated valve. In existing engines, the distance between valve stems is relatively small. The rectangular shape of the pole faces of the present invention allows greater flexibility of design and may allow the pole face area to double within the geometric envelope allowed by the existing engine. Another advantage of the rectangular shapes of the electromagnet elements is that the electromagnets are easily laminated in order to reduce eddy currents. More specifically, the rectangular shaped electromagnetic elements may be easily manufactured from silicon steel laminations. Still another advantage is that the excess mass in the magnetic return paths, typically found in round or ring-like pole faces, is minimized by the rectangular shape of the electromagnet elements.

The valve 10 further includes a plurality of springs 42, best seen as first spring 42a and second spring 42b. The springs 42 are interconnected to the armature 16 through the valve shaft 38. The first spring 42a is connected to a second end 38e of the first valve shaft portion 38a and the second spring 42b is connected to a second end 38f of the second valve shaft portion 38b. The springs 42 serve to return the armature 16 to a central position intermediate the upper electromagnetic element 24 and the lower electromagnetic element 26 after actuation of the valve. The springs 42 are preferably made from wire bent into a helix of variable pitch and radius. Therefore, the springs are non-linear because the force produced as the springs are compressed is not proportional to the distance of compression. Instead, the springs have an increasing stiffness constant as the compression is increased. As compared to linear springs, the non-linear springs of the present invention produce armature movement having a shorter period. Therefore, the motion from one end to the other takes less time, which is critical for the use of valves that run at higher rates of revolution, for example in engines.

Another advantage of the use of non-linear springs 42 is that the spring forces have a force versus displacement profile that resembles and tracks the magnetic forces produced by the electromagnets 24, 26. More specifically, the forces produced by the electromagnets do not vary linearly with the distance of the electromagnets from the armature 16. Instead, the electromagnets produce forces that are proportionally much stronger when the distance of the armature from the electromagnets is very small. The combination of the non-linear springs and the electromagnets allows the electromagnetic force to be able to overcome the spring force at any distance, while using smaller currents.

There has been described hereinabove an exemplary preferred embodiment of the electromagnetically actuated valve according to the principles of the present invention. Those skilled in the art may now make numerous uses of, and departures from, the above-described embodiments without departing from the inventive concepts disclosed herein. Accordingly, the present invention is to be defined solely by the scope of the following claims.

I claim as my invention:

1. An electromagnetically actuated valve comprising:
   an upper electromagnetic element and a lower electromagnetic element, each of said electromagnetic elements having a pole face, a central channel disposed in said pole face, a coil disposed in said channel and a cylindrical bore extending through each said electromagnetic element in said pole face in an area thereof within said central channel wherein said upper and lower electromagnetic elements are in a mirrored relationship to each other, said pole face of said upper electromagnetic element being in a facing relationship to said pole face of said lower electromagnetic element, said cylindrical bore of each of said electromagnetic elements being coaxially disposed along a vertical axis;

an armature shaft, said armature shaft being perpendicular to and spaced from said vertical axis;

an armature disposed intermediate said upper and lower electromagnetic elements said armature having an upper face in a facing relationship to said pole face of said upper electromagnetic element and being substantially mateable therewith when said armature is in a position adjacent said upper electromagnetic element, a lower face in a facing relationship to said pole face of said lower electromagnetic element and being substantially mateable therewith when said armature is in a position adjacent said lower electromagnetic element, a proximal end pivotally mounted to said armature shaft and a distal end generally displaceable along said vertical axis;

an first valve shaft portion disposed in axial slideable engagement within said bore of said upper electromagnetic element extending outwardly therefrom and a second valve shaft portion disposed in axial slideable engagement within said bore of said lower electromagnetic element extending outwardly therefrom, each of said first valve shaft portion and said second valve shaft portion having a first end and a second end, said first end of said first valve shaft portion being in intimate slideable contact with said upper face of said armature at said distal end, said first end of said second valve shaft portion being in intimate slideable contact with said lower face of said armature at said distal end:

a first spring connected to said second end of said first valve shaft portion and a second spring connected to said second end of said second valve shaft portion to return said armature to a position intermediate said upper electromagnetic element and said lower electromagnet element.

2. An electromagnetically actuated valve in accordance with claim 1 wherein said electromagnetic elements have a rectangular cross-section.

3. An electromagnetically actuated valve in accordance with claim 1 wherein each of said first spring and said second spring are non-linear.

4. An electromagnetically actuated valve in accordance with claim 1 wherein said armature is tapered from said proximal end to said distal end.

5. An electromagnetically valve as set forth in claim 1 wherein said armature further includes a first hemispherical projection disposed on said upper face in intimate slideable contact with said first end of said first valve shaft portion, and a second hemispherical projection disposed on said lower face in intimate slideable contact with said first end of said second valve shaft portion.

* * * * *